May 16, 1950 S. J. COHEN 2,507,490
CENTRIFUGAL APPARATUS AND METHOD FOR
EFFECTING CHEMICAL REACTIONS
Filed Jan. 20, 1948 2 Sheets-Sheet 1

INVENTOR
Samuel J. Cohen
BY Robert Calvert
ATTORNEY

May 16, 1950 S. J. COHEN 2,507,490
CENTRIFUGAL APPARATUS AND METHOD FOR
EFFECTING CHEMICAL REACTIONS
Filed Jan. 20, 1948 2 Sheets-Sheet 2
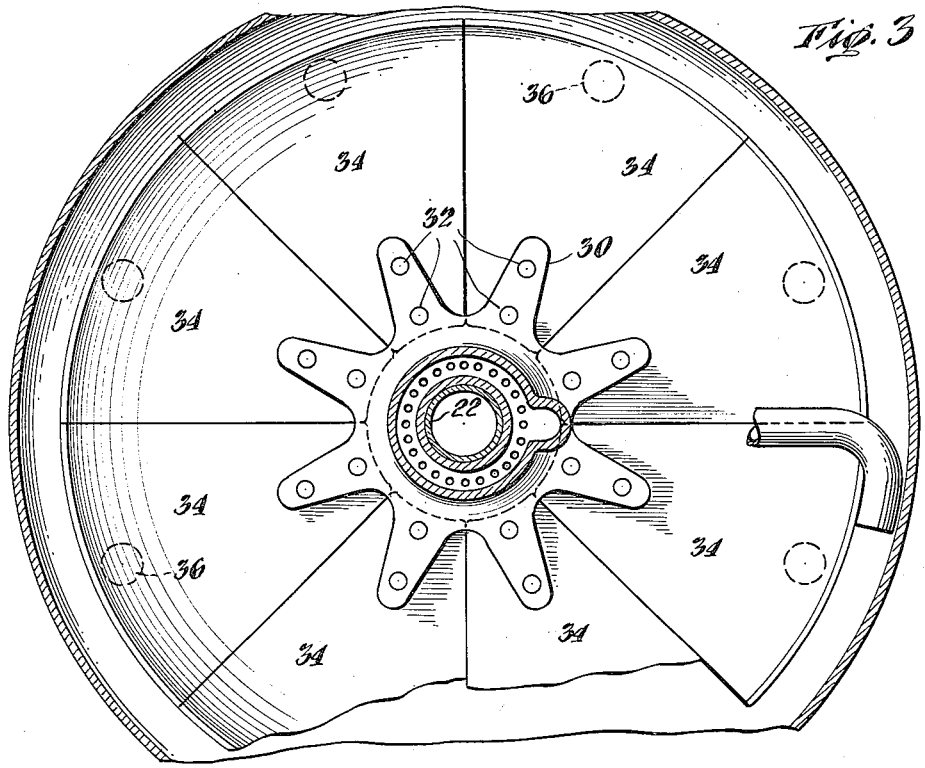
Fig. 3
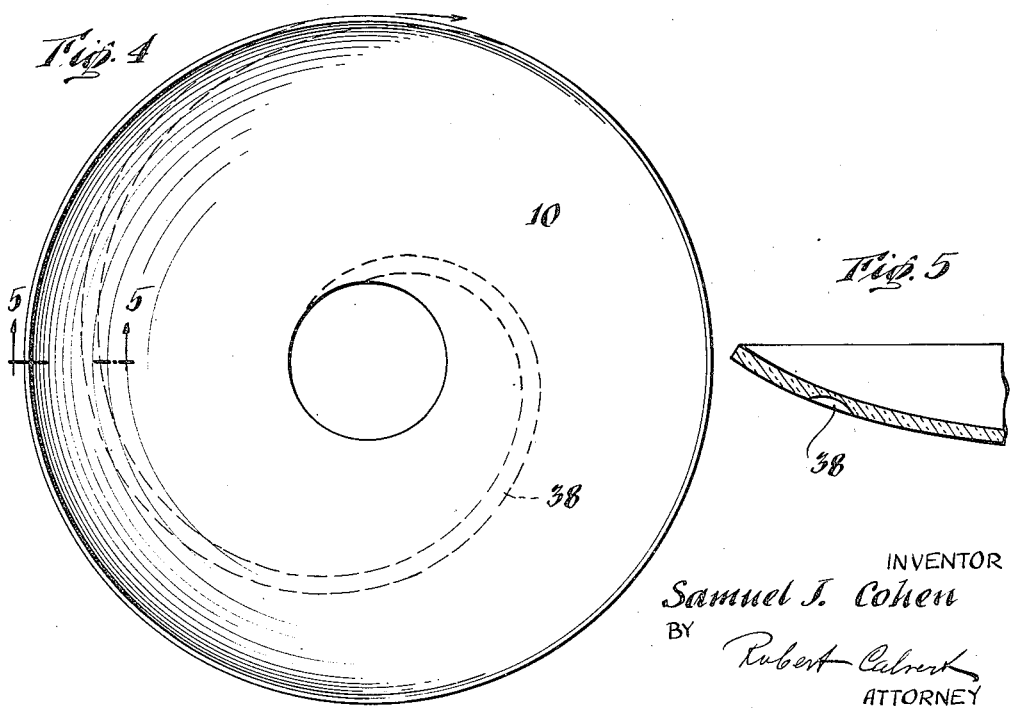
Fig. 4
Fig. 5
INVENTOR
Samuel J. Cohen
BY
Robert Calvert
ATTORNEY Patented May 16, 1950

2,507,490

UNITED STATES PATENT OFFICE 2,507,490

CENTRIFUGAL APPARATUS AND METHOD FOR EFFECTING CHEMICAL REACTIONS

Samuel J. Cohen, Henderson, Nev.

Application January 20, 1948, Serial No. 3,354

5 Claims. (Cl. 204—163)

This invention relates to an apparatus and a method for effecting reaction between fluids.

The invention is particularly adapted for use in chlorinating organic liquids and will be first illustrated by detailed description in connection with such chlorination.

In such reaction, the importance of proper contact and distribution of chlorine in the liquid to be chlorinated is well understood as is also the importance of proper lighting. With the introduction of chlorine into a liquid in the form of the finest bubbles possible or the introduction of the liquid in the form of a fine spray into an atmosphere of chlorine and with the best sources of light, there, however, is non-uniformity of chlorination. When it is desired, for instance, to make a monochlor paraffin, there is always found in the product a large proportion of higher chlorination products. In addition to lack of uniformity of exposure of all molecules of liquid to the chlorine, there is also lack of penetration of the light properly through any substantial depth of liquid, this difficulty being greater with light of short wave lengths, which are particularly desired, than with the longer and less chemically active rays.

These difficulties I overcome by forming the liquid to be chlorinated into an extremely thin film approaching monomolecular thickness, causing this film to contact chlorine in a thin layer moving concurrently with and directly over the film and maintaining contact of the chlorine with the film for a momentary period only.

It was to have been expected in advance of my work that the severe conditions of exposure of the liquid in the form of the film approaching monomolecular thickness would lead to overchlorrination. Under the conditions stated, however, this is not the case and, in fact, greater uniformity of chlorination is obtained than by other known methods.

The invention in a preferred embodiment will be described in connection with the attached drawings showing apparatus constituting a part of the invention and making convenient the operation of the method of the invention.

Fig. 3 is a view on line 3—3 of Fig. 1.

Fig. 4 is a plan view of a modified form of plate.

Fig. 5 is a sectional view on line 5—5 of Fig. 4.

Figure 1:
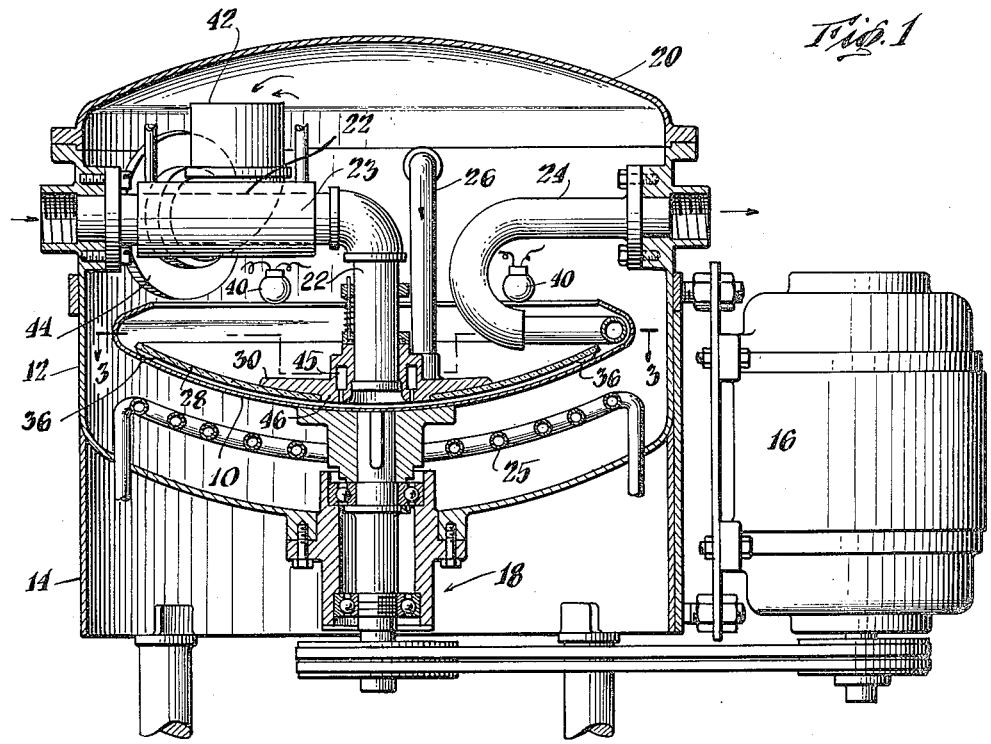
Fig. 1 shows a side view of the apparatus, this view being partly in section.
Figure 2:
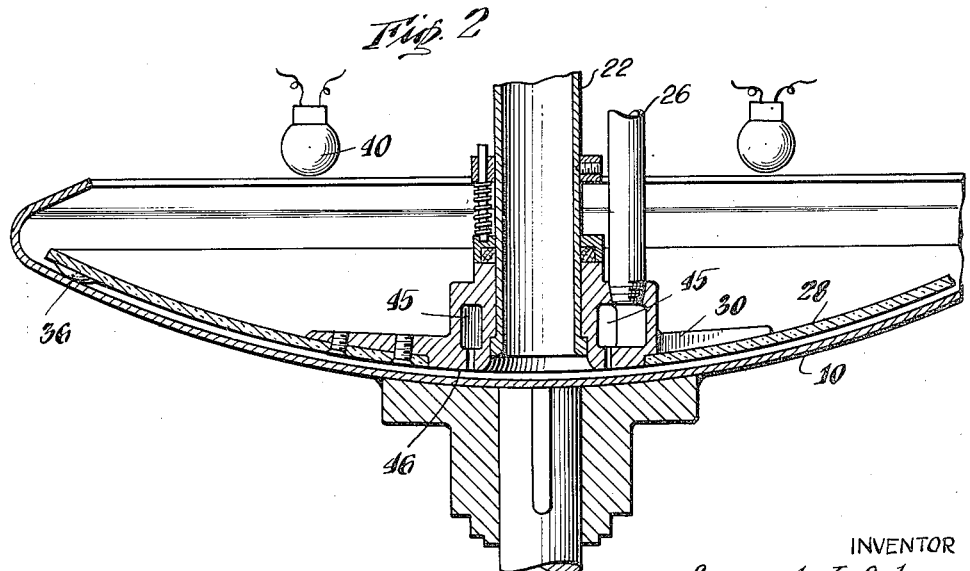
Fig. 2 is a sectional view on a somewhat enlarged scale of a portion of the apparatus shown in Fig. 1.

Features not shown in detail are conventional.

Differences from conventional apparatus, which differences are included in the present invention, reside in means to be described for defining a thin space inside the inner surface of a centrifuge bowl, means for introducing into this space a fluid to react with another fluid supplied to the inner surface of the centrifuge bowl, and, when the reaction is to be accelerated by light, means for supplying light rays in such manner that they fall upon the fluids inside the bowl.

There are shown in the drawings, to which reference is made, a centrifuge bowl 10 that is suitably of a generally flat shape with housing 12, supporting stand 14, conventional drive mechanism with motor 16, mountings and bearings indicated generally at 18, removable cover 20, inlet pipe 22 for liquid to be chlorinated with steam jacket 23 and outlet pipe 24 for the product which passes to the outside of the bowl 10 as the bowl is rotated rapidly. Steam pipes 25 within the housing are included for heating when desired.

There are shown also inlet pipe 26 for the second fluid such as chlorine gas, that is to react with the liquid introduced through line 22 and means including the plate 28, of shape generally conforming to that of the inner surface of the bowl 10, defining a thin space with the inner surface of the bowl for confining within this thin space the fluid introduced through line 26. The plate is suitably formed in sections 34 (Fig. 3) to facilitate assembling the plate in the machine and is secured by means of the spider 30 and bolts 32.

In one embodiment the plate is provided with spacing points 36 that may be in the form of protuberances extending from the said plate for establishing the spacing of the plate from the centrifuge bowl as the latter is rotated.

In one embodiment, the plate 10 is provided with a groove opening in the direction of the base of the centrifuge bowl and extending spirally from the position of introduction of the chlorine to the periphery of the plate, the groove being shown at 38 in Figs. 4 and 5.

In another embodiment (not shown) the plate is secured to the bowl by conventional fastening and spacing elements, so that the plate and bowl rotate together.

The apparatus includes also radiation elements 40 for supplying rays to the liquid in contact with the chlorine. These may be ordinary electric lights for supplying actinic rays or infra red units for heating. Preferably elements of both kinds are used.

Chlorine not used in the reaction and other gaseous materials are withdrawn through outlet 42 attached to a small suction pan 44.

Materials of construction are those that are usual in the various parts of machines of this type and for handling the chemicals present in my operations. Stainless steel parts, for instance, are desirable except that, when exposure of the reacting materials to light or infra red rays is to be made, then the plate 28 is constructed of glass, clear uncolored plastic, or like material which is known to be permeable to actinic or infra red rays.

In general, the method comprises introducing a fluid upon the inner surface of the centrifuge bowl while the bowl is being rapidly rotated. This introduction is made to advantage through the line 22 which delivers the fluid to the central part of the base of the centrifuge bowl. The shoulders 46 limit the thickness of the layer of fluid supplied, to the very short distance between those shoulders and the inner surface of the bowl 10. Under the influence of the rapid rotation of the bowl 10 and the resulting centrifugal force, this thin layer is spread over the entire base of the bowl as a film that becomes continuously attenuated towards the outside of the flat part of the bowl and is reduced in fact to a few thousandths of an inch, say not over ten thousandths, and actually approaches with oily liquids at least the thickness of a monomolecular film.

To the fluid so introduced through line 22, there is applied the chlorine or other fluid chemical which is to be reacted with the first fluid. This second chemical is suitably introduced through the pipe line 26 into the annular distributor space 45 which communicates with the centrifuge bowl.

The second reagent, such as the chlorine, so introduced spreads quickly over the film on bowl 10 and is kept in close and intimate contact therewith by the plate 28 until the centrifugal force, in a period of time that is of the order of 1 to 2 seconds or fractions of a second, throws the contacting liquid and chlorine to the outside of the centrifuge bowl, where the products are separated, the liquid passing through the outlet pipe 24 and to a suitable receiving vessel which is not shown.

Gaseous products and also any unused chlorine are collected within the housing and under the cover, which together form a closed space around the centrifuge bowl except for inlets and outlets described. These gases are withdrawn through the outlet 42. Unused portions of the chlorine gas may be returned to the system through line 26, equipment for removing hydrochloric acid from the used chlorine and handling the gas being not shown as it is conventional.

In this momentary contact and concurrent movement of the chlorine with the liquid to be chlorinated, all molecules of the liquid are exposed to the chlorine so that molecules of liquid are chlorinated uniformly. At the same time, the period of contact between the chlorine and the liquid is so short that over-chlorination of some molecules as compared to the mean degree of chlorination is avoided.

Various dimensions and speeds that are usual with centrifuges may be employed in the machine described. A typical width of the centrifuge basket or bowl 10 is 36 inches and a satisfactory speed of revolution is 1000 to 2000 R. P. M., the best results in establishing the very thin film of liquid on the inner surface of the bowl being obtained when the speed is approximately 1500 to 2000 R. P. M.

It is important that the plate 28 which confines the chlorine within a narrow space directly over the inner surface of the film on plate 10 should be close to plate 10. Suitable spacing is such that the thin space defined between plate 28 and centrifuge bowl 10 is about ¼ inch to 2 inches and preferably ½ to 1 inch. With such spacing the chlorine and the film, as thrown out on the rotating centrifuge bowl, are caused to move concurrently; the chlorine gas is richest at the start of the contact when the degree of chlorination is the least and ordinarily zero and the concentration of chlorine, now mixed with by-product hydrogen, is least towards the outer edge of the bowl where the chlorination of the liquid to the stage desired is nearly complete.

The spiral groove 38 serves to provide a guided reservoir of chlorine from which chloride is brushed off by contact with the film of liquid rotated on the surface of bowl 10.

The invention will be further illustrated by detailed description in connection with the following specific examples of the reaction of two fluid substances within the thin space defined between the centrifuge bowl 10 and the plate 28.

In all of these examples warming may be employed and is in fact employed in those cases in which reaction is too slow at ordinary temperatures. Such warming is effected by pressure steam in parts 23 and 25 or by infrared rays from elements 40, or both.

Besides the increases in rate of reaction that normally accompanies temperature rise, the warming serves another purpose. It causes lowering of viscosity of the liquid being treated and thus increases the thinness of the film on bowl 10, so as to improve the contact of the molecules with the reagent introduced through line 26.

Warming, on the other hand, increases the viscosity and decreases the rate of escape of chlorine or other gas through the reaction space.

Temperatures to which the liquids are heated are about 100° to 200° C. but in no case as high as the boiling point of the liquid under the prevailing pressure.

In all of the examples, as elsewhere herein, proportions are expressed as parts by weight unless otherwise specifically stated.

*Example 1*

Paraffin wax in melted condition is supplied at a temperature of about 170° F. through line 22 to the centrifuge bowl 10, the line 22 and the centrifuge bowl being warmed by steam which passes through the jacket 23 and coils 25. Chlorine gas is supplied at the same time through line 26 in proportion somewhat in excess of the amount required to introduce the desired number of chlorine atoms into each molecule of hydrocarbon present in the paraffin, so as to give, for instance, a product containing between 20% and 42% of chlorine. The chlorine is introduced in fact in proportion about 50% in excess of the theoretical quantity.

The melted paraffin during this chlorination is under the influence of light from the ordinary incandescent light bulbs 40, the plate 28 being of glass so that the actinic rays enter the film of melted paraffin in contact with the chlorine.

The chlorine and film of the melted paraffin are rapidly whirled outwardly through the thin space between plate 28 and centrifuge bowl 10, as the bowl is rotated at 1800 R. P. M., and liquid products are collected and withdrawn through the exhaust line 24 provided with a conventional trap (not shown) to prevent passage of gas. This mixture so withdrawn is then passed into a receiving tank of usual kind constructed of acid proof material and the liquid withdrawn from the bottom of the tank to alkali solution, washing and further refining or processing, in accordance with the usual method of treating chlorinated hydrocarbons to remove unreacted chlorine and that part of the reacted chlorine which is most unstable and most reactive therefore to an alkali treatment.

The mixture of by-product hydrogen chloride and unreacted chlorine, which is removed through the gas outlet 42, is subjected to a scrubbing action as with water and the chlorine which remains unabsorbed is returned through line 26 for reaction with the incoming molten paraffin, equipment referred to herein but not illustrated in the drawing being conventional equipment.

The chlorinated paraffin so produced when subjected to fractionation procedure shows a much smaller variation from the mean degree of chlorination than the chlorinated paraffin made heretofore by the best commercial processes. At the same time, it should be noted that the equipment described is small in size as compared to commercial chlorinators but has a very large output per day because of the very short period of reaction that is used.

In place of the melted paraffin of this example there may be substituted other hydrocarbons, as, for example, kerosene or lubricating oil the substitution being suitably on a mol for mol basis as calculated from the mean molecular weights of the materials to be chlorinated.

Example 2

The procedure of Example 1 is repeated with the exception that reaction is effected by aqueous sodium carbonate and sulfur dioxide to make a solution of sodium sulfite. An aqueous solution of sodium carbonate, containing, say 15 parts of sodium carbonate calculated on the anhydrous basis to 100 parts of water, is supplied through the liquid feed line 22, and sulfur dioxide somewhat in excess of 1 mol for each mol of sodium carbonate is introduced through line 26.

The solution of sodium sulfite so made is freed from excess sulfur dioxide by being brought to a boil and if desired is then evaporated to such state that sodium sulfite is obtained in crystal form on cooling.

The procedure of this example may be varied, to make sodium bisulfite, by increasing the amount of sulfur dioxide to a figure in excess of 2 mols for each mol of sodium carbonate charged to the centrifuge bowl.

The gas mixture which issues through outlet 42 will contain a mixture of unused sulfur dioxide and carbon dioxide. If desired this mixture may be reused until the carbon dioxide builds up to such point that further reaction of the sulfur dioxide is slow, then the waste gases may be discarded and a fresh supply of sulfur dioxide may be used.

Example 3

The procedure of Example 2 is repeated except that the reacted fluids are castor oil and air, the castor oil being suitably introduced at an elevated temperature that is customary in air blowing the oil in tanks. Air is introduced through line 26. Cooling of the oil during the centrifuge treatment with the air is prevented by steam heating the equipment inside the housing, as by admitting steam at selected pressure to coils 25.

In this case there is no by-product gas. There is also no need to reuse any oxygen remaining uncombined in the first passage of the air through the thin space between plate 28 and bowl 10.

Example 4

In this example the two fluids that react are both liquids.

Kerosene is introduced through line 22 and concentrated sulfuric acid through line 26, the apparatus being acid proof as, for instance, of stainless steel construction although plastics may be used for parts that are not subjected to stress. The kerosene may be prewarmed and also maintained during the contact with sulfuric acid at an elevated temperature as, for instance, at about 100° C.

A suitable proportion of the kerosene to sulfuric acid is an equal weight of each, the finished product being separated by difference of specific gravity from the sulfuric acid which remains in part unreacted.

The product is a sulfonated kerosene.

The procedure of this example is varied by the substitution of white mineral oil in one case and, in another, lubricating oil for the kerosene first used.

Example 5

The procedure of Example 4 is followed except that an alkyl benzene as, for instance, methyl or ethyl benzene is substituted for the paraffin hydrocarbon of Example 4 on an equal weight basis, the product in this instance being a sulfonated alkyl benzene.

Example 6

In this example a Friedel and Crafts reaction is effected.

One of the fluids, as, for instance, benzene is mixed with finely divided anhydrous aluminum chloride in the proportion say of 5 parts for 100 parts of benzene. This mixture, in the form of a suspension of the finally divided aluminum chloride in the liquid is introduced through line 22, and ethylene in amount 50% in excess of 1 mol for each mol of the benzene is introduced through line 26. The reactants are maintained as they are whirled through the thin space between plate 28 and rotating bowl 10 at a temperature of about 60° C. by means of the steam coils in the machine and also by preheating of the benzene as introduced through line 22.

Example 7

Cottonseed oil is introduced through line 22 in preheated condition and aqueous sodium hydroxide of strength of about 10% of actual NOH, also in preheated condition, is introduced through line 26. The result is saponification of the fat, giving a sodium soap and glycerine.

Example 8

Chlorinated rubber is made by introducing a solution of raw rubber in a conventional volatile hydrocarbon solvent that is not subject to chlorination and then introducing chlorine through line 26, the procedure being as described under Example 1 and the result being a more uniformly chlorinated rubber product than heretofore obtained in other commercial equipment.

Example 9

In a modification of the invention, a material is irradiated. Thus ergosterol is introduced through line 22. The ergosterol is whirled out in a film approaching monomolecular thickness under the plate 28 which in this case is glass and under influence of strong irradiation by actinic rays from lamps 40 that in this case are preferably ultraviolet lamps.

The light used in any of the above examples may be that from the incandescent filament type, ultraviolet, or infrared when heating is desired, or a combination of all kinds. Whenever any kind of light or infrared heating is employed, then the plate 28 should be of a material so selected as to be permeable to such light or heat rays as, for instance, clear glass or plastic, preferably thin plastic of which cellophane and polyvinyl and methacrylate resins are examples.

Also the procedure of any of the examples may be modified to include repeating the operation described in the several examples. A liquid product passed through the system may be collected over a certain period of time and then returned through line 22, in place of supplying fresh liquid to be treated through that line. In another embodiment, two or more centrifugal machines of kind described may be arranged in series and the liquid output from one machine delivered to the inlet of the next machine for treatment with a fresh supply of a reacting fluid such as chlorine, air, or sulfuric acid in the manner described in the examples for a one-step treatment.

*Example 10*

Fumaric acid is made by introducing furfural through line 22 and an aqueous solution of sodium hypochlorite through line 26, the operation being otherwise as described above.

*Example 11*

A chlorinated paraffin wax containing 43 per cent of chlorine is mixed with 3 per cent of its weight of copper powder and supplied at a temperature of 250° C. to the whirling bowl 10, the apparatus being evacuated by blower on the gas outlet line. The result is dehydrochlorination.

The method and apparatus described are quick and simple in operation and for a given volume of output require far less capital investment and floor space than conventional reactors. While the time of contact between the reacting materials of the present invention is extremely short, the exposure of the liquid in the form of the extremely thin almost monomolecular film and the travel of this film through a path 15 feet or so long, as it is whirled outwardly in spiral manner over the inner surface of a 2-foot centrifuge bowl, for instance, insures adequate contact of each molecule of the liquid with a gas or other liquid reacted therewith even when, as in most of these examples given, the two fluids are not freely miscible with each other by solution.

It will be understood also that it is intended to cover all changes and modifications of the examples of the invention herein chosen for the purpose of illustration which do not constitute departures from the spirit and scope of the invention.

What I claim is:

1. Apparatus for effecting contact between two fluid substances which comprises a centrifuge bowl, means for rotating the bowl at high speed, an inlet conduit for supplying a fluid to the upper surface of the bottom of the bowl, a second inlet conduit for delivering a second fluid, a plate provided with a central opening and disposed in conforming relationship and at a slight distance above the said bottom of the bowl so that a narrow space is defined between the said plate and bottom, and mounting means securing the plate in fixed relationship to the bottom of the centrifuge bowl so that the plate and bottom are rotatable together, the said inlet conduit and second inlet conduit communicating at their delivery ends with the said opening, so that the two fluids are delivered through the said opening to the space between the centrifuge bowl and plate and to approximately the center of rotation of the centrifuge bowl.

2. An apparatus as described in claim 1, the said plate being of light permeable material and the apparatus including a source of light disposed above the said plate.

3. An apparatus as described in claim 1, the said plate being provided with a groove opening in the direction of the said bottom of the centrifuge bowl and the groove extending spirally from the inside towards the periphery of the plate.

4. The method of effecting a chemical reaction between two fluids which comprises supplying one of the said fluids to the inner surface of a rapidly rotating centrifuge bowl and at approximately the center of rotation thereof, supplying the other of the fluids to the thin film of the first fluid so formed and at approximately the said center, confining the two fluids within a space of thickness not substantially more than 0.01 inch, so that, as the fluids move outwardly under centrifugal force, the fluids are maintained in intimate and continuous contact with each other, and causing the film to become continuously thinner as it moves outwardly under the influence of the centrifugal force.

5. The method described in claim 4, one of the said fluids being a liquid to be chlorinated and the other of the fluids being chlorine and light being caused to fall upon the said film to accelerate the chlorination.

SAMUEL J. COHEN.

REFERENCES CITED

The following references are of record in the file of this patent:

UNITED STATES PATENTS

| Number | Name | Date |
|---|---|---|
| 468,689 | Peck | Feb. 9, 1892 |
| 1,629,200 | Buhtz | May 17, 1927 |
| 2,132,431 | O'Brien | Oct. 11, 1938 |
| 2,200,254 | Bender | May 14, 1940 |
| 2,291,574 | Gleason et al. | July 28, 1942 |
| 2,343,668 | Hickman | Mar. 7, 1944 |

FOREIGN PATENTS

| Number | Country | Date |
|---|---|---|
| 517,992 | Germany | Nov. 12, 1931 |